(12) United States Patent
Loboz et al.

(10) Patent No.: US 7,222,178 B2
(45) Date of Patent: May 22, 2007

(54) TRANSACTION-PROCESSING PERFORMANCE BY PREFERENTIALLY REUSING FREQUENTLY USED PROCESSES

(75) Inventors: Charles Zdzislaw Loboz, West Ryde (AU); Jonatan Kelu, Gransville (AU); Raymond Cheung, West Pennant Hills (AU); Paul Street, Westleigh (AU)

(73) Assignee: Unisys Corporation, Blue Bell, PA (US)

( * ) Notice: Subject to any disclaimer, the term of this patent is extended or adjusted under 35 U.S.C. 154(b) by 113 days.

(21) Appl. No.: 10/516,474

(22) PCT Filed: May 31, 2002

(86) PCT No.: PCT/US02/17099

§ 371 (c)(1),
(2), (4) Date: Nov. 30, 2004

(87) PCT Pub. No.: WO2005/008493

PCT Pub. Date: Jan. 27, 2005

(65) Prior Publication Data

US 2006/0015870 A1 Jan. 19, 2006

(51) Int. Cl.
*G06F 15/173* (2006.01)
*G06F 9/46* (2006.01)

(52) U.S. Cl. .................... 709/226; 718/102

(58) Field of Classification Search ............ 709/203, 709/226; 718/102–108; 455/453
See application file for complete search history.

(56) References Cited

U.S. PATENT DOCUMENTS

| 5,752,030 A * | 5/1998 | Konno et al. ........... 718/102 |
| 5,918,017 A | 6/1999 | Attanasio et al. |
| 6,185,619 B1 | 2/2001 | Joffe et al. |
| 6,915,516 B1 * | 7/2005 | Glidewell .............. 718/103 |

FOREIGN PATENT DOCUMENTS

WO   WO 2005008493   *   1/2005

OTHER PUBLICATIONS

A communication-Ordered Task Graph Allocation Algorithm, Evans, J.D. & Kessler, R.R., Apr. 1992, p. 1-25.*
Scheduling real-time task for dependability, Oh, Y., et al., Journal of the Operational Research Society, 1997.*
International Search Report, May 31, 2002.

* cited by examiner

*Primary Examiner*—Beatriz Prieto
(74) *Attorney, Agent, or Firm*—Alfred W. Kozak; Charles A. Johnson; Beth L. McMahon

(57) ABSTRACT

The present invention relates to an apparatus and method for improving transaction processing performance in a transaction processing system, particularly but not exclusively, in a transaction processing computing system comprising a plurality of processors.

5 Claims, 3 Drawing Sheets

Figure 1 - Prior Art

TRANSACTION-PROCESSING PERFORMANCE BY PREFERENTIALLY REUSING FREQUENTLY USED PROCESSES

FIELD OF THE INVENTION

The present invention relates to an apparatus and method for improving transaction processing performance in a transaction processing system, particularly but not exclusively, in a transaction processing computing system comprising a plurality of processors.

BACKGROUND OF THE INVENTION

As the demand for computing resources has increased exponentially over the past decade, new ways have been sought to allow computing systems to process large amounts of data and user requests in an efficient manner.

A common way to handle a large number of simultaneous user requests on a single computing system is to divide the requests either by software or by hardware, into separate "tasks" or "transactions". In a software environment, this has become known as multi-tasking, a method whereby simultaneous user requests are placed in a queue, and executed in a sequential manner by a process. A transaction request will be understood to be a request generated by a software application, for some task to be performed by a computing system. A process will be understood to be a component (usually software) within an operating system which accepts a transaction request (hereinafter referred to as a "transaction"), queues the transaction, and then processes the transaction. Processing the transaction will be understood to mean carrying out a task or tasks requested by the transaction. The task and/or tasks may include any suitable instructions, such as searching a database, carrying out a mathematical calculation, writing to a file, accessing a hardware device, or any other activity which may be performed by a computing system. In a hardware environment, the ability to handle multiple simultaneous user requests has commonly been enhanced by using more than one central processing unit (processor).

When constructing operating systems, or other software designed to run in a multi-tasking environment, programmers are faced with the issue of deciding how transactions are allocated amongst several processes. The simplest way to decide which process a transaction will be sent to is to allocate the process in a round robin fashion. That is, a transaction currently waiting in the queue would be allocated to the next available process.

Alternatively, other operating systems allocate transactions randomly to any process, irrespective of its availability or other operating characteristics.

Such allocation systems have been found by the present applicants to be sub-optimal, because they do not take into account the time overhead involved in flushing various memory caches used for the previous process, and restocking various memory caches before the new transaction can be processed.

When a transaction is scheduled to be executed by a process that has been idle for some time rather than by a process that has recently completed executing a transaction, there is a high likelihood that the code and data used by the previous transaction has been flushed from the process's associated cache (for example, the cache in a processor used by the process). Therefore, the probability of cache misses is increased and performance suffers accordingly.

In addition, when a transaction is scheduled to a process that has been idle for some time rather than to a process that has recently become available, the likelihood that the process's associated virtual memory has been paged out to disk is also increased. Therefore, the probability of page faults occurring is increased and performance suffers accordingly. A page fault will be understood to mean an error which occurs when a program requests data that is not currently loaded into memory. This requires an operating system to fetch the requested data from a storage device and load it into memory.

Similarly, the same performance degradation may occur with any type of associated cache memory whether it be processor cache, main system memory, or virtual memory on a data storage device, such as a hard disk.

The problem of having a high number of process cache misses or other secondary cache misses due to the random scheduling of incoming transactions to any available process is not addressed by the prior art. It has generally been assumed by programmers that the operating system which resides on the computing system will schedule the transactions to processes in the most efficient manner possible. This assumption may be incorrect for certain applications.

While it is true that some operating systems have better scheduling strategies than others, in general the operating system is not aware of the specific architecture of the applications it is running, and therefore it cannot fully optimise the transaction scheduling for these applications.

In the past, the problem of having increased page faults due to the scheduling of incoming transactions to processes that may have already had their virtual memory swapped out to disk is generally addressed by adding more RAM (Random Access Memory) to a system. While this works well in general, it increases the hardware requirements for the system. Thus, adding RAM is also a sub-optimal solution as it does not address the fundamental nature of the problem. Therefore, there is a need for a new system and method which allows for more efficient use of computing resources.

SUMMARY OF THE INVENTION

In accordance with a first aspect of the present invention, there is provided a method of scheduling transactions within a computing system, comprising the steps of receiving a transaction request from a client, determining the idle server process that most recently finished execution of a previous transaction, and forwarding the transaction request to the most recently idle process.

This has the advantage of reducing the probability that a process's cache or any other types of cache memory will need to be flushed before the process can begin execution.

Preferably, the method is implemented as a sub-module within a gateway module, whereby the gateway module is responsible for receiving transaction requests from a client, and allocating the requests to server processes.

Preferably, the method further comprises the step of storing the most recent finish time and the status of a server process in a database.

In accordance with a second aspect of the present invention, there is provided a system arranged to schedule transactions within a computing environment comprising a transaction request means arranged to receive a transaction request from a client, determination means, arranged to determine the idle server process that most recently finished execution of a previous transaction, and forwarding means arranged to forward the transaction request to the most recently idle process.

In accordance with a third aspect, the present invention provides a computer program arranged, when loaded onto a computer, to instruct the computer to operate in accordance with a system for scheduling transactions within a computing system, comprising a transaction request means arranged to receive a transaction request from a client, determination means arranged to determine the idle server process that most recently finished execution of a previous transaction, and forwarding means arranged to forward the transaction request to the most recently idle process.

In accordance with a fourth aspect, the present invention provides a computer readable medium having a computer readable program code embodied therein for causing a computer to operate in accordance with a system for scheduling transactions within a computing system, comprising a transaction request means arranged to receive a transaction request from a client, determination means arranged to determine the idle server process that most recently finished execution of a previous transaction, and forwarding means arranged to forward the transaction request to the most recently idle process.

BRIEF DESCRIPTION OF THE DRAWINGS

The present invention will now be described by way of example only with reference to the accompanying drawings, in which.

DESCRIPTION OF A PREFERRED
EMBODIMENT OF THE PRESENT INVENTION

The present invention broadly relates to a system and a corresponding method which preferably enables a more efficient use of multiple process or multi-tasking computing systems.

In particular, an embodiment of the present invention applies to an Enterprise Application Environment as implemented on the Windows™ and Unix™ platforms. The term Enterprise Application Environment will be understood to mean one type of computing system arranged to process many user requests at once. This could include, but is not limited to, a database application server, web server, or any other type of computing system arranged to process a large number of simultaneous user requests.

It will also be understood that whilst the particular embodiment described relates to an Enterprise Application Environment, the present invention may be used in any computing system, whether the computing system consists of a single processor, or multiple processors.

Figure 1:
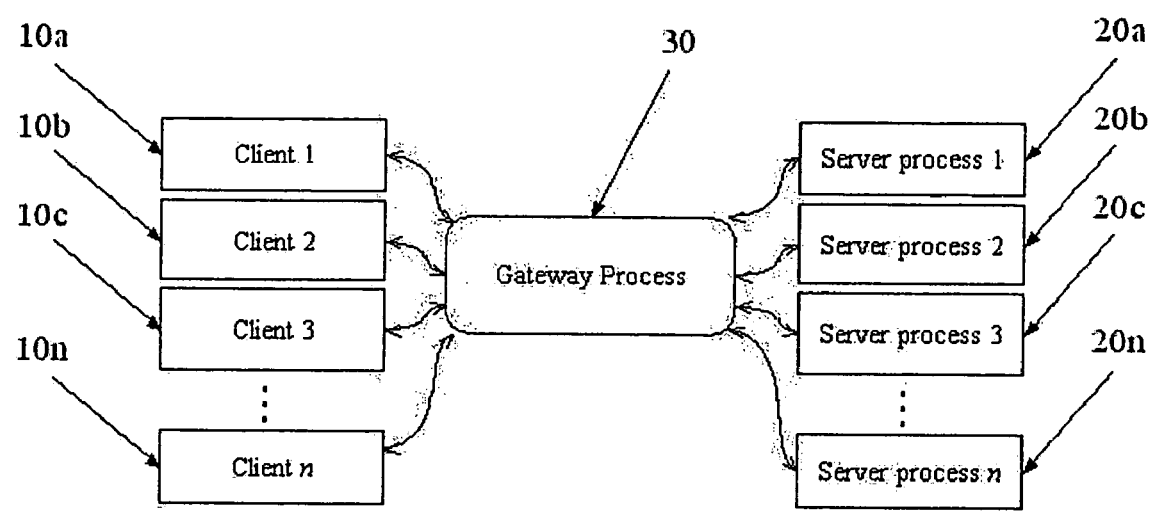
FIG. 1 is a schematic block diagram illustrating a prior art system for scheduling transactions across several processors (e.g. several separate CPUs)

FIG. 1 depicts a block diagram of a common prior art system for scheduling transactions across several processors.

The block diagram in FIG. 1 illustrates an enterprise application environment architecture, where each client 10a, 10b, . . . , 10n runs in a separate process and where each process may be running on a separate machine or a separate processor within the same machine. It will also be understood that the "server" denoted in FIG. 1 may also refer to a server process. That is, a server process is a "virtual" server that may be implemented in software alone (i.e. more than one server process may map onto a single processor or computing system). A client 10a, 10b, . . . , 10n may be a user located at a remote terminal, making a request from their user terminal to the server, or the client may also take the form of a request from another software application residing on the computing system. Each server process 20a, 20b, . . . , 20n also runs in a separate process. It will be understood that in the context of the present invention, the term "server process" will refer to a particular process implemented within a computing system, and the term does not necessarily denote a physically separate computing system or a separate CPU within the same computing system. However, the term "server process" may encompass a separate physical computing system or a separate CPU within the same computing system.

The clients 10a, 10b, . . . , 10n connect to a gateway process 30. The gateway process functions as a conduit forwarding transaction requests to the server processes, and receiving server responses for forwarding to the appropriate client. The server processes 20a, 20b, . . . , 20n remain idle until they receive a transaction request from the gateway process 30. When the transaction request is received, the server performs the appropriate processing, and subsequently relays a response to the gateway process 30. The gateway process 30 then relays the server process response to a client 10n. In the prior art, the transaction requests are commonly randomly assigned, or assigned in a "round robin" fashion, by the gateway process 30 to an available server 20n. It will be understood that the gateway process is commonly implemented as a module within an operating system which resides on the computing system. It will be understood that the gateway process may be implemented as a software module within (or as a layer on) a software operating system, or the gateway process also be implemented as hardware, for example, as a separate component such as a ROM chip attached to other computing hardware. Any current or future hardware or software tools used to implement the invention is within the contemplation of a person skilled in the art.

Figure 2:
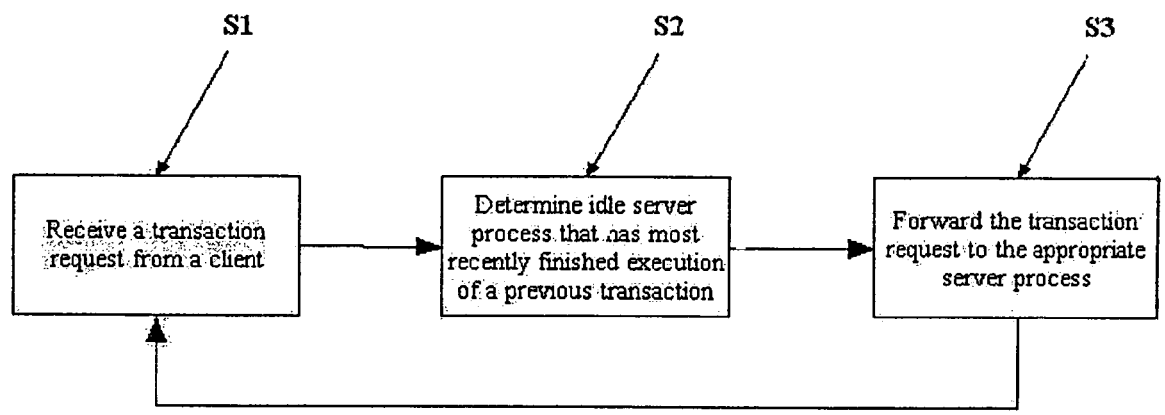
FIG. 2 is a flow diagram illustrating a request assignment algorithm in accordance with an embodiment of the present invention.

FIG. 2 illustrates a system architecture implementing an embodiment of the present invention. In this embodiment, there is provided a gateway module arranged to receive transaction requests and forward the transaction requests to server processes.

Referring to FIG. 2, a three step algorithm is used to determine the server process to which the gateway process should forward the next transaction request.

The first step S1 is for the gateway process to wait for the transaction request from the client. The second step S2 is to determine the idle server process that has most recently finished execution of a previous transaction.

The third step S3 is to forward the transaction request to the server process which has most recently finished execution of the previous transaction.

In an embodiment of the present invention, the second step S2 and third step S3 is achieved by the addition of a new software module that tracks the amount of time each server process has been idle and forwards the current transaction request to the process that has most recently become available on an available server.

Figure 3:
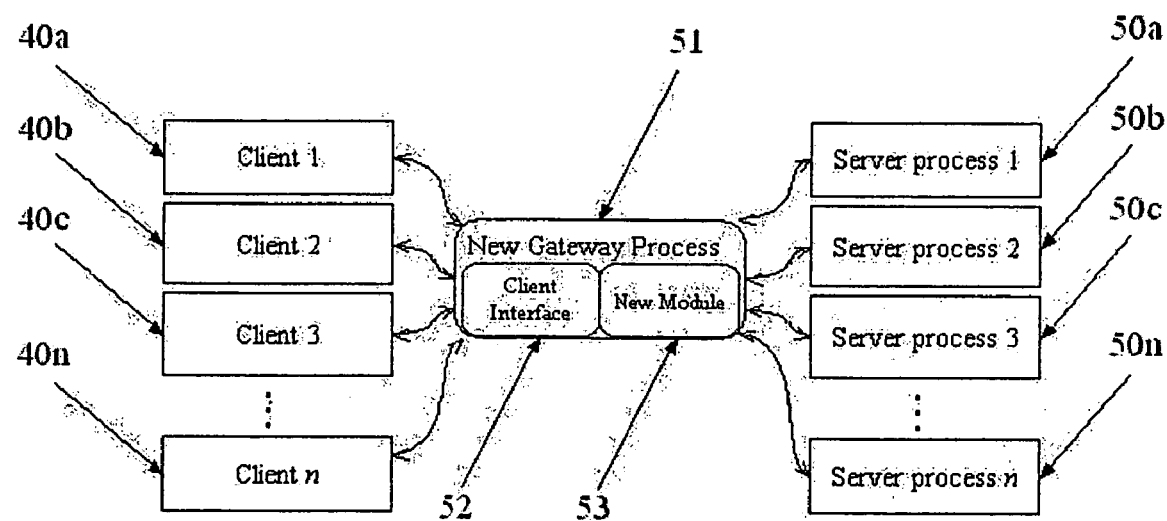
FIG. 3 is a schematic block diagram illustrating a system in accordance with an embodiment of the present invention.

The addition of the new module is shown in the block diagram of FIG. 3, which represents a system in accordance with an embodiment of the present invention. Clients 40a, 40b, . . . , 40n interact with the new gateway process 51 which consists of two sub-modules. The first is the client interface 52 which is responsible for interacting with client requests. The new module 53 performs the function of determining the idle server process that most recently finished execution of the previous transaction, in addition to the task of forwarding transaction requests to the server processes 50*a*, 50*b*, . . . , 50*n*.

In an embodiment of the present invention,,the new module 53 is arranged to hold a number of tables, each table containing a number of entries equal to the number of (server) processes available.

The first table held by the new module 53 is a server process status table, which contains a flag that indicates the current status of each server process (i.e. whether the server process is busy or free).

The second table held by the new module 53 contains the server process finish time (i.e. the time the server process finished processing the last transaction request).

When a new transaction request arrives from the client, after passing through the gateway process, the new module 53 will firstly find the server process with the highest free time (by searching the server process finish time table) and the server process status (as found in the server process status table). In this context, the phrase "highest free time" will be understood to mean the server process time table entry with the most recent completion time. Secondly, the new module 53 will assign the incoming transaction request to a currently free server process with the highest free time (by placing the transaction request into the processes message queue) and will subsequently set the entry in the server process status table to "busy".

Subsequently, when a transaction request has been successfully completed by the server process, the new module 53 will set the server process status flag to "free" in the server process status table and store the current time in the server process finish time table. It will be understood that whilst, in this-particular embodiment, the new module sets the status flag and stores the current time other implementations are possible. For example, the server process may perform these functions.

In the following example, it is assumed that there are four server processes run by the operating system residing on a computing system. The gateway process contains a table with three columns, and four entries in each column. These four entries denote the four server processes.

Let us assume that the-current time is 12.05 and the gateway process has received a transaction request. The gateway process must assign the transaction request to one of the four server processes.

At this point in time, the table contains the following entries:

TABLE 1

Contents of table at 12.05

| Server Process Number | Status | Finish Time |
| --- | --- | --- |
| 1 | Busy | 11.59 |
| 2 | Free | 12.01 |
| 3 | Free | 12.02 |
| 4 | Free | 11.48 |

From the table, it is apparent that server process 1 is busy (and the "finish time" represents the finish time of the previously processed transaction). Furthermore, server processes 2, 3 and 4 are free. Of these free server processes, server process 3 has the highest finish time value. Therefore, according to the algorithm outlined in the preceding paragraphs, the new module 53 forwards the transaction to server process 3. The new module subsequently changes the table entry for server process 3 to "busy", but it will be noted that the finish time for server process 3 remains at 12.02, since the finish time represents the finish time of the previously processed transaction.

At 12.07, server process 1 finishes processing the transaction, and therefore updates the status entry in the table to reflect this change. That is, for server process 1 the status entry in the table changes to "free", and the finish time is changed to 12.07, representing the finish time of the last transaction request to be processed by server process 1.

At 12.08, a new transaction request arrives at the gateway process. At this point, the table now reads as follows:

TABLE 2

Status of server processors at 12.08

| Server Process Number | Status | Finish Time |
| --- | --- | --- |
| 1 | Free | 12.07 |
| 2 | Free | 12.01 |
| 3 | Busy | 12.02 |
| 4 | Free | 11.48 |

The new module 53 transaction will assign the transaction to the most recently used server process 1, since server process 1 meets the criteria of being a free server process with the highest finish time entry.

At 12.10, the transaction request at server process 3 finishes. Thus, the table will be updated such that the status of server process 3 will change to free, and the finish time for server process 3 will be changed to 12.10. At 12.11, a new transaction arrives at the gateway process, and the new module 53 will assign the new transaction request to server process 3.

It should be noted that throughout this worked example, server processes 2 and 4 were ignored by the new module and no transactions were assigned to either server process, even though they were free to perform the transaction request. Instead,, only server processes 1 and 3 received transactions for processing as they were not only free but also the most recently used server processes.

In effect, this creates a dynamic situation, making it impossible for a user or a computing system to predict which server process will receive the transaction ahead of time. Which server process receives the transaction request will depend on the current status of all server processes at the transaction request arrival time. Therefore, the server process usage is stochastic but not random. The algorithm used to assign transaction requests to server processes skews the probability of a server process being used towards higher usage of server processes which have most recently been used. That is, in the long run, certain server processes receive more transaction requests than other server processes.

Moreover, the memory and CPU overhead involved in making changes to the tables is minimal in comparison to the total time taken for a transaction request to be performed.

The entire process involves setting the values in status and finish time tables, searching for a minimum value in a small table (typically the number of server processes is well below 100) and reading the system clock (routinely done for housekeeping purposes)

This method further preferably reduces the need for setting fixed processor affinities to server processors, as the inherent "process stickiness" produced by the present embodiment will keep the most recently used transaction request on the same process.

The new module 53 provides a number of benefits over the existing gateway process 30 shown in FIG. 1. Firstly, the server process to which the new transaction request is forwarded by the new module 53 is the server process which has most recently completed execution of the previous transaction request. This particular server process is the least likely server process to have had the process memory cache flushed or overwritten. Depending on the operating system scheduling policy, the performance improvement due to the reduced probability of cache misses will vary. However, irrespective of the operating system residing on the computing system, there is preferably at worst no negative impact on performance, and at best a positive impact on performance. In addition, the most recently requested transactions are least likely to have had the associated process virtual memory swapped out to disk. Therefore, it is less likely that page faults would occur, also improving performance.

Furthermore with continued use of an embodiment of the present invention, a natural processing order is formed, such that the most frequent transaction requests are prioritised over the least frequent transaction requests.

In turn, the least frequently used processes will be the first transactions to have their associated process memory swapped out to disk. This results in three additional benefits that compound the performance gains described above.

Firstly, swapping out the memory of the least requested transactions to disk leaves more RAM (Random Access Memory) for the most frequently used processes, resulting in further reductions to the number of page faults.

Secondly, the less frequently used transaction requests will have less opportunity to overwrite the process cache of the most frequently used transaction requests, thus further reducing the number of process cache misses.

Thirdly, when one of the less frequently used transaction requests is scheduled to a process, the cost of the corresponding page faults is minimised over a long period of time so that the significance of the associated performance penalty is significantly reduced.

Therefore, the present invention provides more efficient use of computing resources, and overcomes the sub-optimal prior solutions for process scheduling in multi-processor and/or multi-thread environments.

It will be understood that the invention is not limited to multi-processor environments or computing systems. The invention may be used on a single processor computing system to allocated incoming transaction requests to server processes.

The invention claimed is:

1. A method for scheduling transactions within a computing system, whereby the method is implemented as a sub-module within a gateway process module, and the gateway process module is responsible for receiving transaction requests from a client and for allocating the requests to server processes, wherein each server process interacts with a separate central processing unit, said method comprising the steps of:
   (a) receiving a transaction request from a client;
   (b) storing the most recent finish time and the status of a server process;
   (c) determining the idled server process that most recently finished execution of a previous transaction;
   (d) forwarding the transaction request to the most recently idled process.

2. A method in accordance with claim 1, wherein the method is implemented as a software module arranged to operate in an enterprise application environment.

3. A system for scheduling transactions within a computing system, comprising:
   (a) a transaction request means arranged to receive a transaction request from a client;
   (b) determination means arranged to determine the idled server process that most recently finished execution of a previous transaction; and
   (c) forwarding means arranged to forward the transaction request to the most recently idled process.

4. A computer program arranged, when loaded onto a computer, to instruct the computer to operate in accordance with a system for scheduling transactions within a computing system, comprising:
   (a) a transaction request means arranged to receive a transaction request from a client;
   (b) determination means arranged to determine the idled server process that most recently finished execution of a previous transaction; and
   (c) forwarding means arranged to forward the transaction request to the most recently idled process.

5. A computer readable medium having a computer readable program code embodied therein for causing a computer to operate in accordance with a system for scheduling transactions within a computing system, comprising:
   (a) a transaction request means arranged to receive a transaction request from a client;
   (b) determination means arranged to determine the idled server process that most recently finished execution of a previous transaction; and
   (c) forwarding means arranged to forward the transaction request to the most recently idled process.

* * * * *